Nov. 4, 1947.   V. C. CASS   2,430,158
VEHICLE WHEEL MOUNTING MEANS
Filed July 27, 1946   2 Sheets-Sheet 1

INVENTOR.
Vernon C. Cass
BY
Atty.

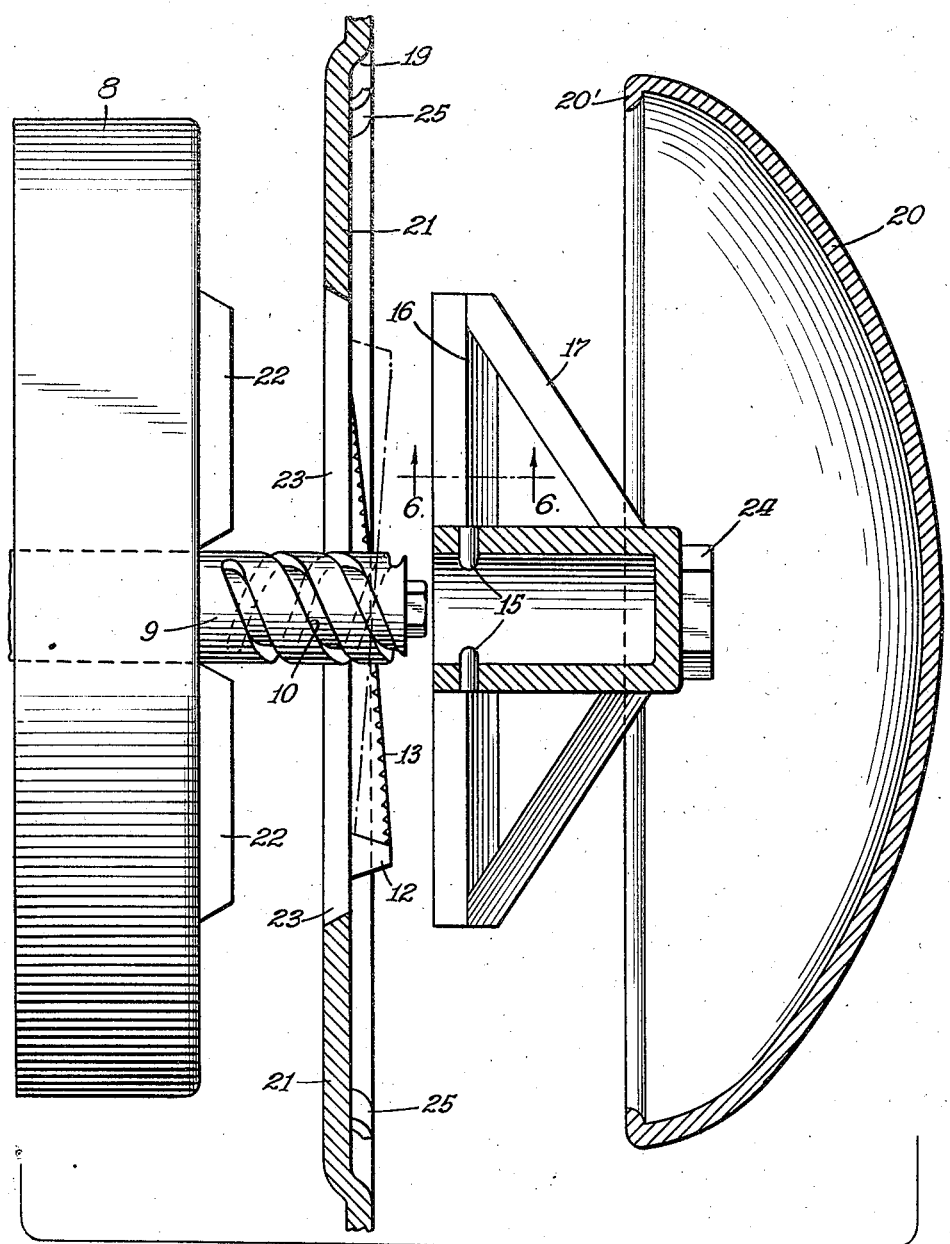
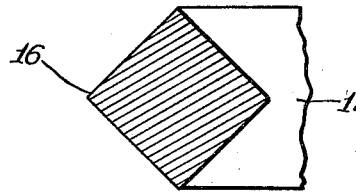
Fig. 5.
Fig. 6.
INVENTOR.
Vernon C. Cass

Patented Nov. 4, 1947

2,430,158

UNITED STATES PATENT OFFICE 2,430,158

VEHICLE WHEEL MOUNTING MEANS

Vernon C. Cass, Chicago, Ill.

Application July 27, 1946, Serial No. 686,744

4 Claims. (Cl. 301—9)

My invention appertains to vehicle wheel mounting means permitting a wheel to be quickly attached or removed.

A main object of my invention is to provide improved vehicle wheel mounting means of the afore-mentioned character, which does away with the present bolts and lugs used for mounting vehicle wheels, and which are undesirable because they consume considerably more time in both the removal and attachment of vehicle wheels.

An important object of my invention is to provide vehicle wheel mounting means, which consists of key, or spline, means being integral with the hub structure, and corresponding slotted means, or key-ways for locating the vehicle wheel in position, the vehicle wheel being provided with semi-circularly formed helical and toothed portions for engagement of a locking bolt, which is provided with knife-edged means adapted to engage in locking relationship the said toothed semi-helical formations.

A further object of my invention is to provide a single centrally located lock nut arrangement for mounting and dismounting vehicle wheels.

A further object of my invention is to provide a vehicle wheel mounting means of the aforementioned character which is practical in construction, efficient in its operation and use, and of such simple elemental construction as to warrant economical manufacture thereof in quantity production.

Other features, and ancillary objects inherent in my invention will become apparent to those familiar with the art, by reference to the accompanying drawings, bearing further elucidation in the ensuing description, wherein like symbols are used to designate like parts, and in which:

Fig. 5 is an exploded view shown partially in cross-section, indicating and depicting the elemental structural relationship of the parts comprising my invention.

Fig. 6 is a fragmentary and enlarged cross-sectional view taken, substantially, on the line 6—6 of Fig. 5.

Figure 1:
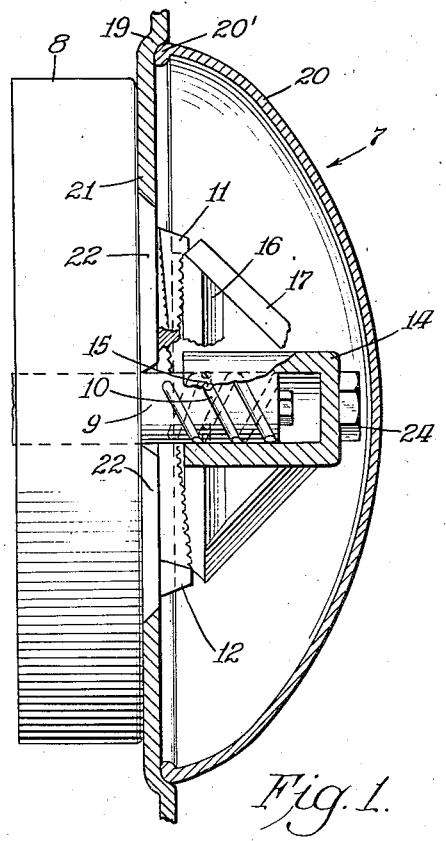
Fig. 1 is a cross-sectional view of my invention.
Figure 2:
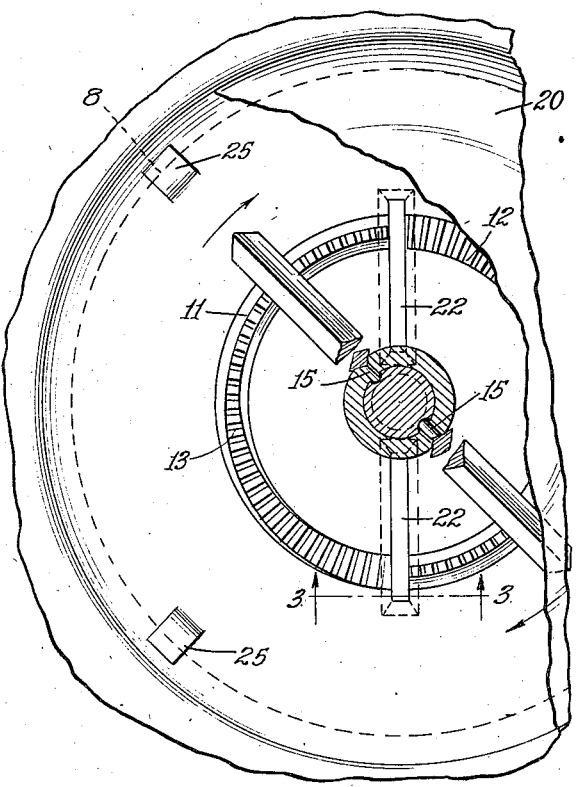
Fig. 2 is a side view of Fig. 1, with certain portions thereof broken away, in order to more clearly depict the elemental structure comprising my invention.

Referring to the various views, my invention is generally designated 7, and consists of wheel mounting means, which is mounted on the hub 8, having the rotatable extension 9 thereon suitably connected to the prime mover of the vehicle. The said rotatable extension 9 is provided with a quick lead thread 10, engaged by the pins 15, which are secured to the hub of the lock nut 14.

The lock nut 14 is attached, or removed by means of the polygonal extension 24 by application of a wrench fitted thereto. The vehicle wheel 21 is provided with key-ways 23 which are used for locating vehicle wheel 21 with respect to the splines 22 formed integrally with the hub 8. When the wheel is located in place, then the lock nut 14 is applied and tightened, or the reverse procedure is followed in removing the same.

The locking feature of the lock nut, which consists of a hub 14, has at its lower surface, diametrally extended ribs 16, which are of rhombic or square cross-section, as indicated in Fig. 6, and which provide the knife-like edges 16 for engaging the toothed portion 13 of the two semi-helical portions designated 11 and 12. Thus, a certain amount of force is required to lock the nut 14, or to unlock the same when removing it, depending on the engagement of the knife-like edges 16 with the indentations 13. The rib 17 serves to reinforce and secure to the hub 14 the ribs 16 so as to provide and furnish a rigid lock nut construction.

Figure 4:
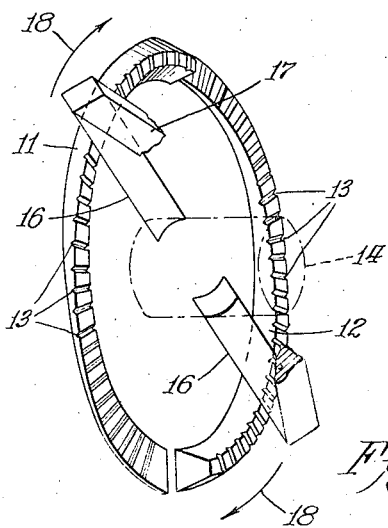
Fig. 4 is a perspective view of the semi-helical means and knife-edged means cooperating therewith, in order to secure locking engagement of the lock nut structure; an important feature of my invention.
Figure 3:
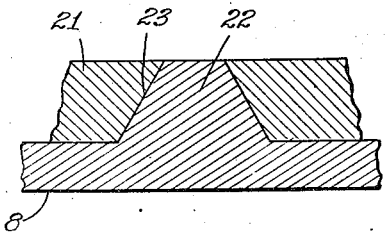
Fig. 3 is a fragmentary cross-sectional view in enlargement taken, substantially, on the line 3—3 of Fig. 2.

As can be noted, when the lock nut is rotated in the direction of the arrows 18, Fig. 4, the thread 10 through its engagement with the pins 15, causes the lock nut to travel in a downward direction, causing the knife-like edges 17 at the same time to climb the semi-helical portions 11, or in other words, to move in a direction antagonistic to the downward movement, thus providing excellent and ideal lock nut action.

The wheel is also provided with an indentation 19 for reinforcement, and for retaining the flange portion 20' of the hub cap 20, which is used primarily for decorative purposes, the recessed portion 21 having tab portions 25 cut therefrom, so as to provide a resilient and snapping action for the hub cap 20 when it is pressed into engagement, or pried off for accessibility to the nut 14 for removal, or attachment of the wheel.

I believe, I have herein described rather succinctly, the operation and construction of my invention, and inasmuch as the same is susceptible of modifications, alterations and improvements, I hereby reserve the right to all modifications, alterations and improvements coming within the scope and spirit of my invention, as well as all those suggestively indicated and embraced in the accompanying drawings, and also all those that may fall within the purview of the foregoing description; my invention to be limited only to the subjoined claims.

Having thus described and revealed my invention, what I claim as novel and desire to secure by Letters Patent is:

1. Vehicle wheel mounting means comprising, a motivating hub provided with a plural number of locating splines, a wheel drum provided with key-ways adapted to fit removably over the said splines, and further provided with semi-helical toothed means, and lock nut means provided with extended rib portions having knife-like edges adapted to engage the toothed portions of the said semi-helical toothed means.

2. Vehicle wheel mounting means comprising, a motivating hub provided with a plural number of locating splines, and further provided with a threaded central extension, a wheel drum provided with key-ways adapted to fit removably over the said splines, and further provided with semi-helical toothed means, and lock nut means removably attachable to the said threaded central extension and provided with extended rib portions having knife-like edges adapted to engage the toothed portions of the said semi-helical toothed means.

3. Vehicle wheel mounting means comprising, a motivating hub provided with a plural number of locating splines, a wheel drum provided with key-ways adapted to fit removably over the said splines, and further provided with semi-helical toothed means, and lock nut means provided with extended rib portions having knife-like edges adapted to engage the toothed portions of the said semi-helical toothed means, the said semi-helical toothed means having a lead or pitch contra to that of the said lock nut means.

4. Vehicle wheel mounting means comprising, a motivating hub provided with a threaded central extension, a wheel drum provided with key-ways adapted to fit removably over the said splines, and further provided with semi-helical toothed means, and lock nut means removably attachable to the said threaded central extension and provided with extended rib portions having knife-like edges adapted to engage the toothed portions of the said semi-helical toothed means, the said semi-helical toothed means having a lead or pitch contra to that of the said threaded central extension.

VERNON C. CASS.

REFERENCES CITED

The following references are of record in the file of this patent:

UNITED STATES PATENTS

| Number | Name | Date |
| --- | --- | --- |
| 2,227,340 | Gaguinto | Dec. 31, 1940 |
| 2,244,083 | Richter | June 3, 1941 |